(12) United States Patent
Rogers

(10) Patent No.: US 7,871,132 B2
(45) Date of Patent: Jan. 18, 2011

(54) DYNAMIC CINCHING LATCH PLATE

(75) Inventor: Robert F. Rogers, Orion, MI (US)

(73) Assignee: TK Holdings Inc., Auburn Hills, MI (US)

( * ) Notice: Subject to any disclaimer, the term of this patent is extended or adjusted under 35 U.S.C. 154(b) by 390 days.

(21) Appl. No.: 11/902,057

(22) Filed: Sep. 18, 2007

(65) Prior Publication Data
US 2009/0072609 A1    Mar. 19, 2009

(51) Int. Cl.
*A44B 11/06* (2006.01)
(52) U.S. Cl. .......................................... 297/469; 24/171
(58) Field of Classification Search ................. 297/469, 297/470, 471, 472, 482; 24/168, 171, 196
See application file for complete search history.

(56) References Cited

U.S. PATENT DOCUMENTS

| | | | | |
|---|---|---|---|---|
| 3,169,291 A | * | 2/1965 | Stacheri | 24/196 |
| 3,486,203 A | * | 12/1969 | Cadiou | 24/196 |
| 4,009,510 A | * | 3/1977 | Lindblad | 24/196 |
| 4,588,207 A | * | 5/1986 | Doty | 280/801.1 |
| 4,903,377 A | * | 2/1990 | Doty | 24/194 |
| 5,417,455 A | * | 5/1995 | Drinane et al. | 280/808 |
| 5,806,148 A | | 9/1998 | McFalls et al. | |
| 6,533,315 B2 | | 3/2003 | Brown et al. | |

* cited by examiner

*Primary Examiner*—Joseph Edell
(74) *Attorney, Agent, or Firm*—Foley & Lardner LLP

(57) ABSTRACT

A seat belt system comprises a seat belt, a tongue, and a buckle. The seat belt includes webbing with a lap portion and a shoulder portion. The buckle receives and latches the tongue. The tongue includes a slot to receive the webbing. The webbing slides within the slot to connect the webbing to the tongue. The tongue further includes a cinching mechanism to cinch the webbing in the slot. The system also includes a cinching control module that initiates the cinching mechanism to cinch the webbing in the slot when a load of about 3.0 kN or more is exerted on the seat belt. The cinching mechanism prevents translation of the seat belt from the lap portion to the shoulder portion.

8 Claims, 6 Drawing Sheets

DYNAMIC CINCHING LATCH PLATE

BACKGROUND

The present invention relates generally to the field of seat belt latch plates. More specifically, the present invention relates to cinching of latch plates.

Seat belts generally include a tongue that is releasable locked in a buckle and a latch mechanism. Conventional latch mechanisms allow seat belt webbing to pass through in both directions under all loading conditions. Other conventional latch mechanisms cinch a lap belt portion of the seat belt webbing and prevent movement of the lap belt portion of the webbing towards a shoulder portion of the seat belt webbing during low load conditions. This can create uncomfortable belt forces on the pelvic area of the occupant during some driving conditions, such as on rough roads.

SUMMARY

One exemplary embodiment relates to a tongue assembly. The tongue assembly comprises: a tongue releasably connectable to a buckle; a belt gripping insert; a slide member movable between a belt gripping position and a non-gripping position; and a slot in the tongue to receive a seat belt. The slide member moves into the belt gripping position when a load of about 3.0 kN or more is exerted on the seat belt. The belt gripping position is configured to prevent movement of the seat belt within the slot.

Another exemplary embodiment relates to a seat belt system. The system comprises: a seat belt with webbing, the webbing including a lap portion and a shoulder portion; a tongue with a slot and a cinching mechanism, the webbing passing through the slot; a buckle to receive and latch the tongue; and a cinching control module. The cinching control module is configured to initiate the cinching mechanism to cinch the webbing in the slot when a load of about 3.0 kN or more is exerted on the seat belt. The cinching mechanism is configured to prevent translation of the seat belt from the lap portion to the shoulder portion.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 7A illustrates the tongue assembly in an open position and FIG. 7B illustrates the tongue assembly in a gripping position.

DETAILED DESCRIPTION

A seat belt assembly is a vehicle occupant safety device configured to protect an occupant from injuries resulting from a sudden stop, crash, or imminent crash situation. Seat belts are intended to restrain, or hold in place, a vehicle occupant in order to prevent injuries resulting from forcible contact with an interior vehicle component or ejection from a vehicle.

Referring generally to the FIGURES, a seat belt assembly 10 may be installed in a vehicle for use by an occupant of the vehicle. A vehicle occupant may be an operator, a front passenger, a rear passenger, etc. or any combination thereof. Traditional seat belts can use a single continuous loop of webbing. This configuration dissipates the energy created by the moving occupant over the length of the seat belt during a collision. Most lap portions of seat belts are equipped with a retention mechanism to tighten, or cinch, the lap portion of the belt, when a low load is applied, to restrain a vehicle occupant. Most shoulder portions of seat belts include pretensioners which tighten the belt instantaneously, under low load conditions, to prevent an occupant from being catapulted forward. This can create uncomfortable belt forces for the occupant during some driving conditions, such as rough roads.

It is an object of an exemplary embodiment to prevent cinching of a seat belt lap portion during low loads and to cinch the lap portion of the seat belt during loads greater than about 3.0 kN (or, alternatively, greater than about 3.5 kN), such as those loads that occur during a crash situation.

It is an object of an embodiment to initiate a cinching mechanism by a control module upon at least one of the following: (1) load sensor sensing a load of about 3.0 kN or more; (2) crash sensor sensing an imminent or occurring crash situation; and (3) shoulder belt pretensioner being activated.

Figure 1:
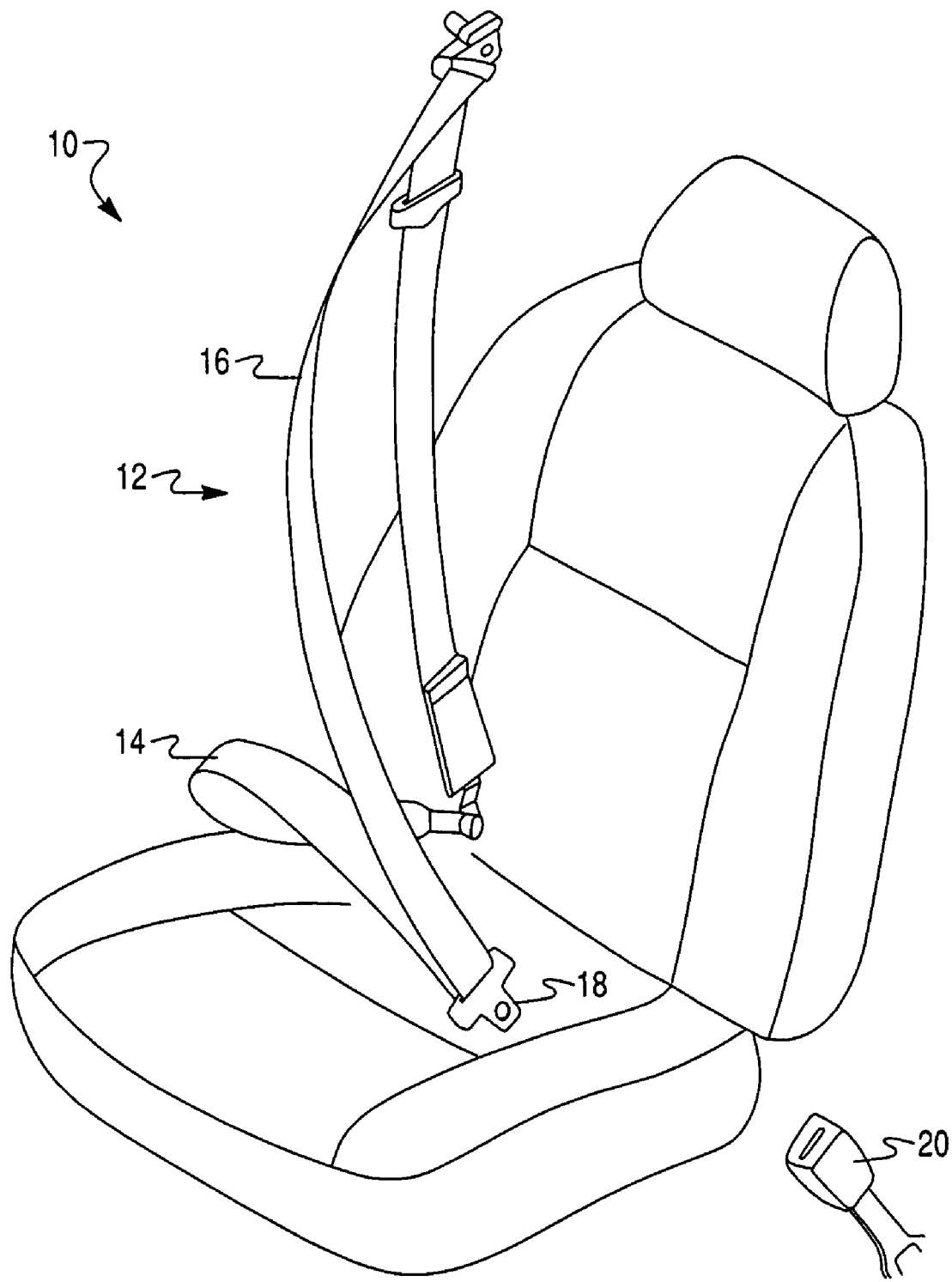
FIG. 1 is a perspective view of a vehicle seat with a seat belt assembly according to an exemplary embodiment.

In an exemplary embodiment, as illustrated in FIG. 1, seat belt assembly 10 generally includes: a seat belt 12 containing a lap portion 14, to protect the lower body of the occupant, and a shoulder portion 16, to protect the upper body of the occupant; a tongue assembly 18 releasably connected to a buckle 20; a seat belt gripping insert 22 (Shown in FIG. 7A and FIG. 7B) configured to prevent translation of the seat belt from lap portion 14 to shoulder portion 16 in the event of a vehicle collision; and a slide member 24 (Shown in FIG. 3) movable between a belt gripping position and a non-gripping position.

Figure 2:
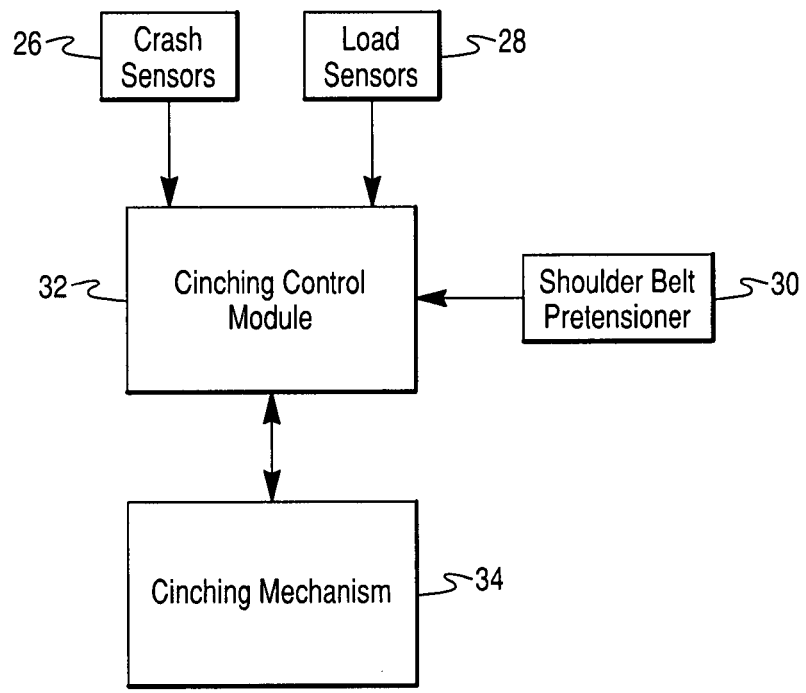
FIG. 2 is a flow diagram of a control sequence for the seat belt assembly illustrated in FIG. 1 according to another exemplary embodiment.

In an exemplary embodiment, as shown in FIG. 2, a crash sensor 26, located within the vehicle, can be used to sense an occurring or imminent crash. The crash sensor(s) 26 may include one or more of a vehicle rollover sensor, an acceleration sensor, and/or any other suitable crash sensor. When crash sensor 26 senses a crash condition, a signal is sent to a cinching control module 32. In addition to, or separate from the crash sensor 26, a load sensor 28 senses a load on the seat belt 12, such as during a crash condition, and sends a signal to the cinching control module 32. Cinching control module 32 is configured to initiate a cinching mechanism 34 used to cinch (grip) the webbing in tongue assembly 18 when a load of about 3.0 kN or more is exerted on the seat belt 12. The control module 32 may be just a cinching control module, or it may be a safety control module that also controls deployment of other safety mechanisms, such as an airbag, a pretensioner, a retractor, etc. Activating cinching mechanism 34 prevents translation of the seat belt webbing from lap portion 14 to shoulder portion 16. Alternatively, the cinching mechanism 34 may be activated when a load of about 3.5 kN or more is exerted on the seat belt 12.

In another exemplary embodiment, as illustrated in FIG. 2, a shoulder belt pretensioner 30 may be activated upon an imminent or occurring crash. When pretensioner 30 initiates, cinching control module 32 initiates cinching mechanism 34 to cinch the webbing and prevent translation of the webbing from lap portion 14 of seat belt 12 to shoulder portion 16 of seat belt 12.

Figure 3:
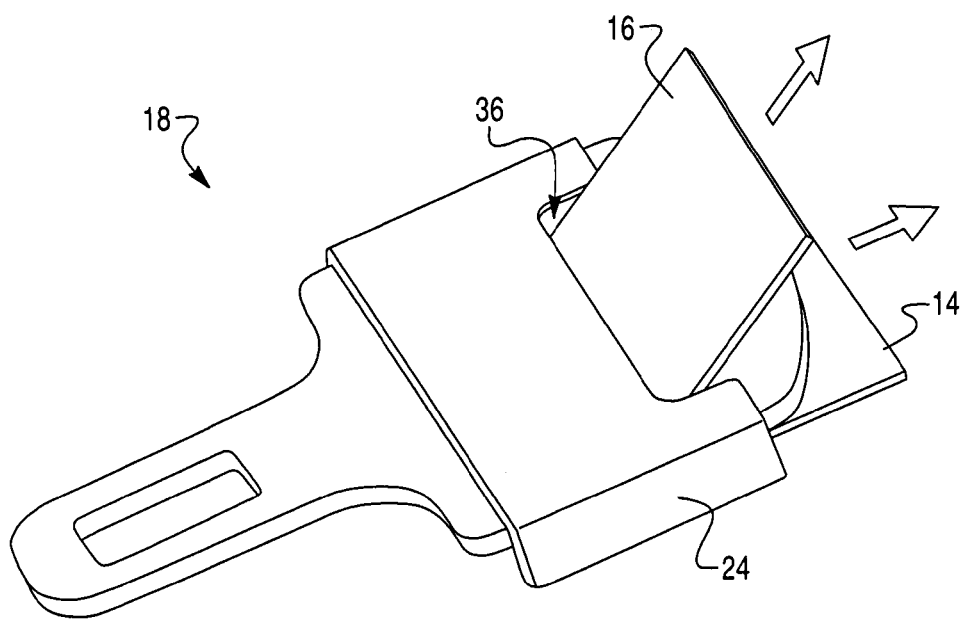
FIG. 3 is a perspective view of a tongue assembly for the seat belt assembly illustrated in FIG. 1 according to another exemplary embodiment.
Figure 4:
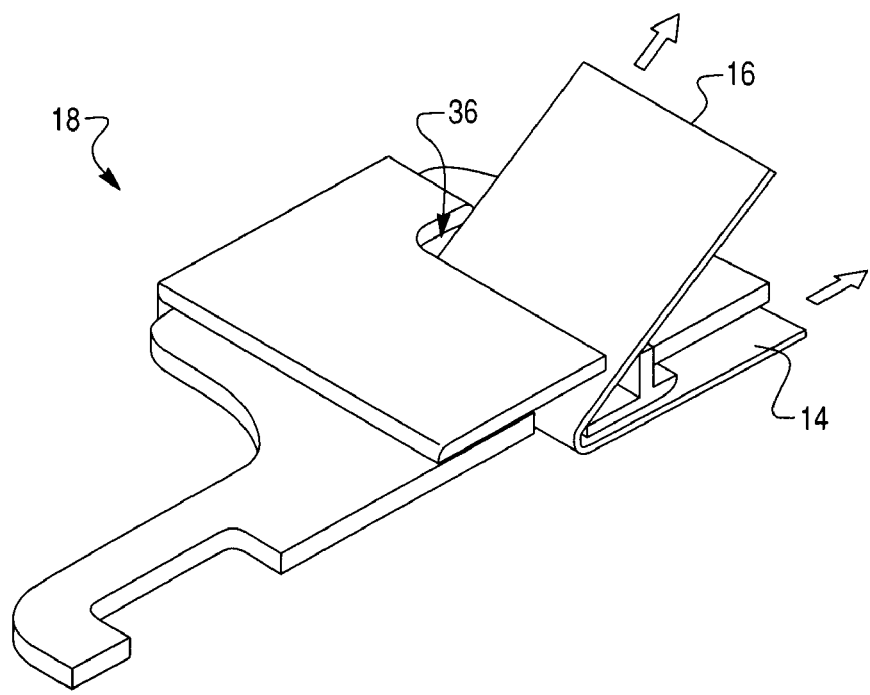
FIG. 4 is a cross section of a perspective view of a tongue assembly for the seat belt assembly illustrated in FIG. 1 according to another exemplary embodiment.

In an exemplary embodiment, tongue assembly 18 is illustrated in FIG. 3 and FIG. 4. Under low occupant load conditions, those less than about 3.0 kN, seat belt 12 is allowed to pass through a slot 36 in tongue assembly 18 in both a direction towards the lap portion 14 of the seat belt 12 or in the direction towards the shoulder portion 16 of the seat belt 12. Once a high occupant load is determined by load sensor 28, such as a load greater than about 3.0 kN, the cinching control module 32 is activated and the seat belt 12 can be cinched (or gripped) to prevent translation of the webbing from the lap portion 14 of the seat belt 12 to the shoulder portion 16 of the seat belt 12.

Figure 5:
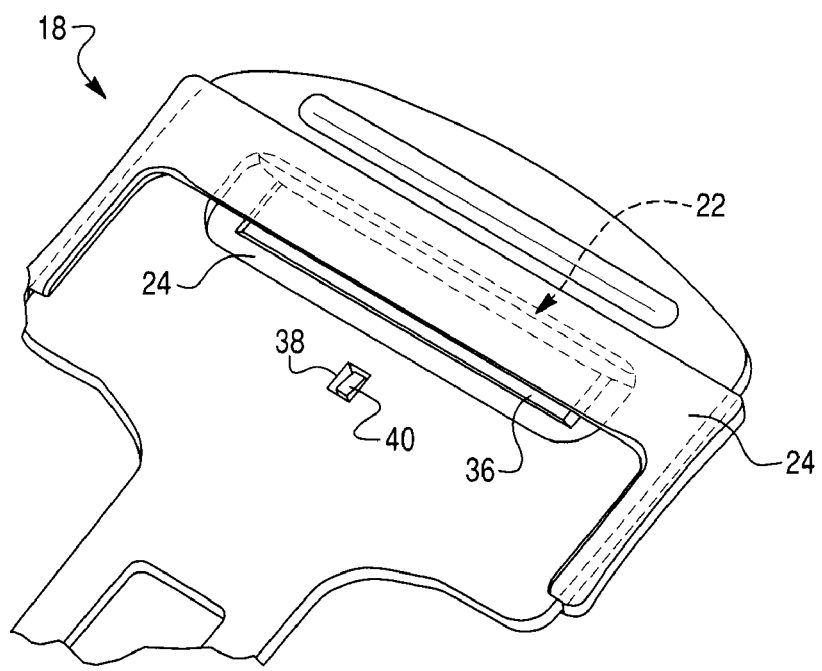
FIG. 5 is a perspective view of a tongue assembly in an open position for use with the seat belt assembly illustrated in FIG. 1 according to another exemplary embodiment.
Figure 6:
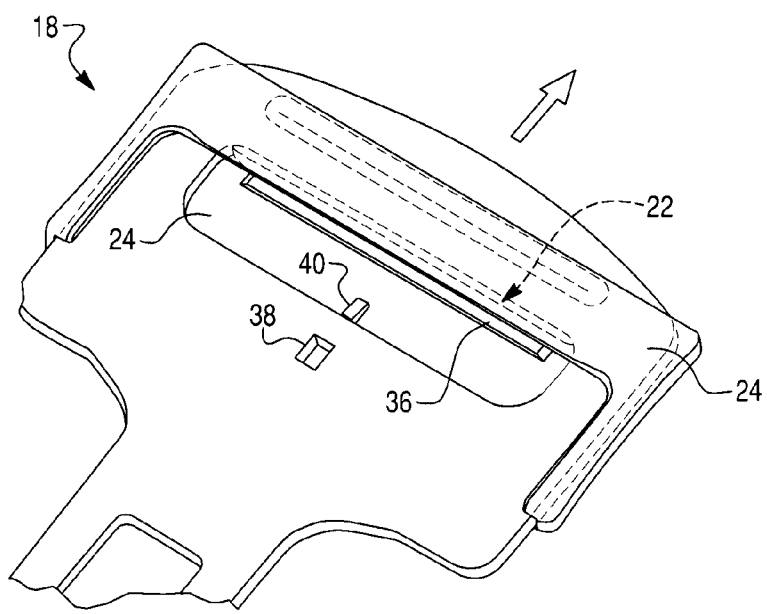
FIG. 6 is a perspective view of a tongue assembly in a cinched mode for use with the seat belt assembly illustrated in FIG. 1 according to another exemplary embodiment.

Illustrated in FIG. 5, in an exemplary embodiment, is tongue assembly 18 under a low occupant load condition, or one less than 3.0 kN. Seat belt 12 (not shown in FIG. 5) can pass freely through slot 36 on slide member 24. Slide member 24 is initially held in place by a retention feature 38 mounted on the slide member 24 that contacts a mating feature 40 on the tongue assembly 18 to prevent motion of the slide member 24 at a belt load less than about 3.0 kN. When a load greater than about 3.0 kN is applied, slide member 24 moves into a belt gripping position as illustrated in FIG. 6. Retention feature 38 releases from mating feature 40 and slide member 24 moves in the direction shown to cinch or grip seat belt 12. Alternatively, retention feature 38 prevents motion of the slide member 24 at a belt load less than about 3.5 kN.

Figure 7A:
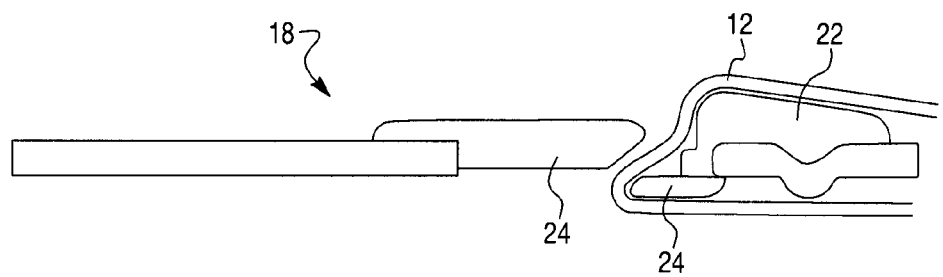
FIGS. 7A and 7B are cross-sectional views of a tongue assembly for use with the seat belt assembly of FIG. 1 according to another embodiment.
Figure 7B:
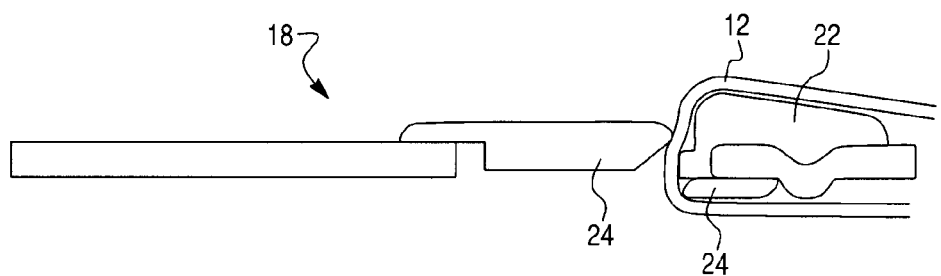

FIGS. 7A and 7B illustrate the tongue assembly 18 in an open position (FIG. 7A) and a closed position (FIG. 7B) according to another embodiment. Initially, the slide member 24 is in the open (non-grip) position, allowing the seat belt 12 to slide or move within the slot 36. When a load of about 3.0 kN is applied to the seat belt 12, the slide member 24 moves toward the insert 22. Thus, the seat belt 12 is cinched (gripped) between the slide member 24 and the insert, preventing translation movement of the seat belt 12.

Figure 8:
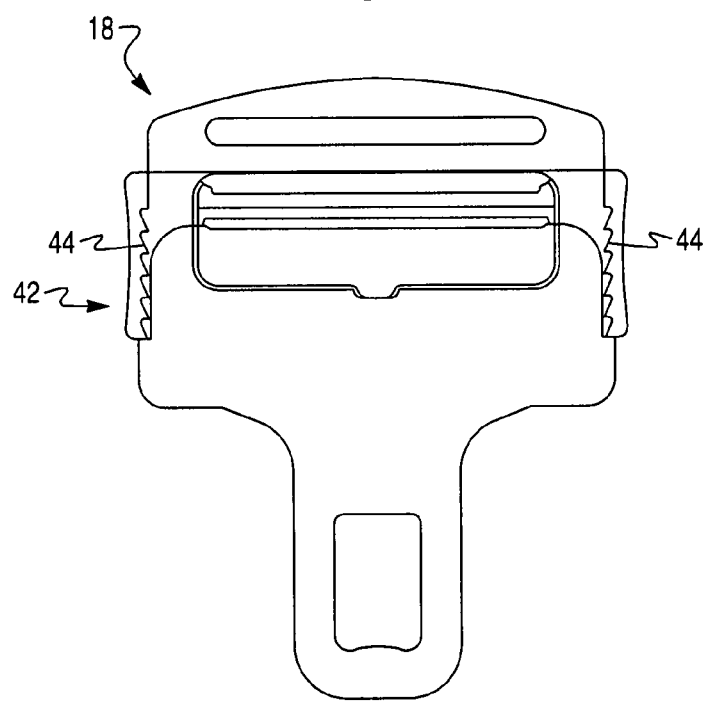
FIG. 8 is a front view of a tongue assembly with teeth for use with the seat belt assembly illustrated in FIG. 1 according to another exemplary embodiment.
Figure 9:
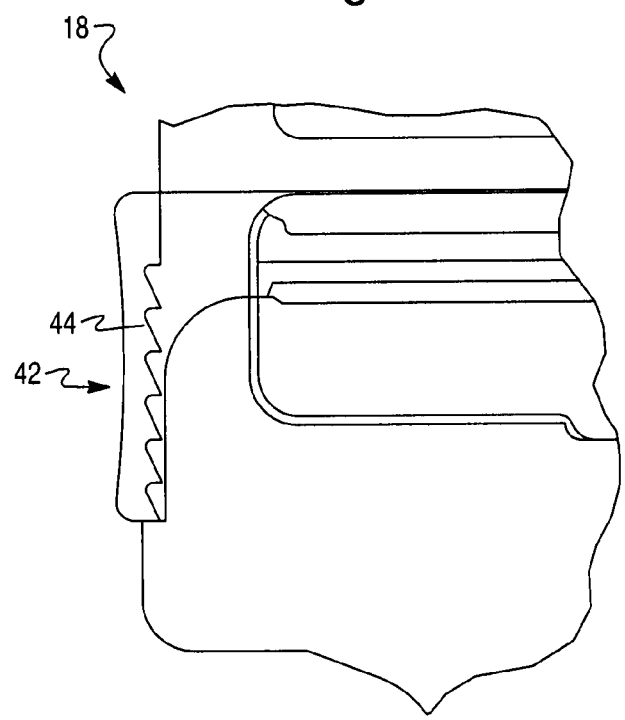
FIG. 9 is a front view of a section of the tongue assembly illustrated in FIG. 7 according to another exemplary embodiment.

In another exemplary embodiment, tongue assembly 18 is illustrated in FIG. 8 and FIG. 9. Slide member 24 and belt gripping insert 22 can be combined together as a unitary piece 42. Unitary piece 42 is held in both open and belt gripping positions by sets of teeth 44 located on the sides of tongue assembly 18.

Figure 10:
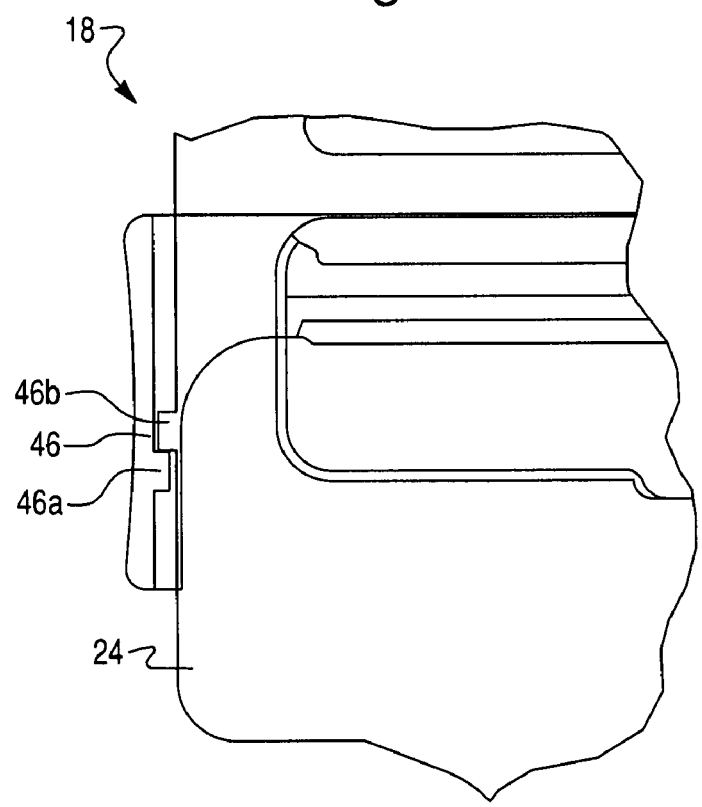
FIG. 10 is a front view of a section of a tongue assembly with a stop for holding a slide member in an open or gripping position for use with the seat belt assembly illustrated in FIG. 1 according to another exemplary embodiment.
Figure 11:
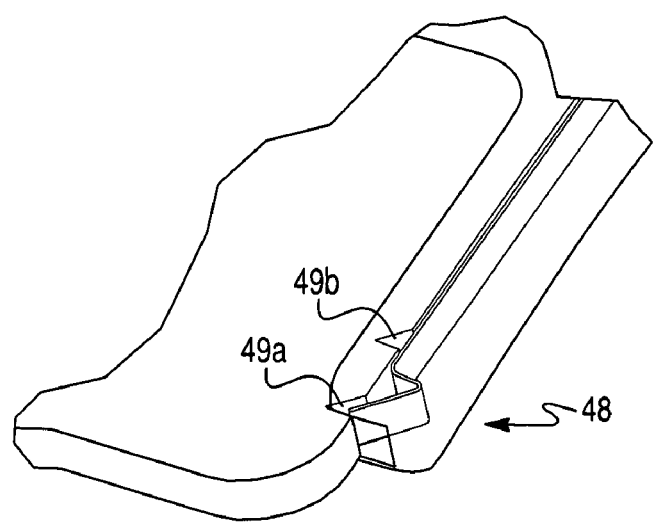
FIG. 11 is a front view of a section of a tongue assembly with a spring for holding a slide member in an open or gripping position for use with the seat belt assembly illustrated in FIG. 1 according to another exemplary embodiment.

In another exemplary embodiment, as illustrated in FIG. 10, a stop 46 may be used to hold slide member 24 in both open (non-grip) and web gripping positions. For example, the stop 46 may include first and second protruding portions 46a and 46b. The protruding portion 46a, 46b abut against one another and maintain the slide member 24 (and thus the tongue assembly 18) in the open position. When a load greater than about 3.0 kN (or, alternatively, 3.5 kN) is exerted on the seat belt 12, the first protruding portion 46a moves past the second protruding portion 46b. Thus, the sliding member 24 moves into a gripping position.

In another exemplary embodiment, as illustrated in FIG. 10, a spring 48 may be used to hold slide member 24 in both open (non-grip) and web gripping positions. The spring 48 is initially positioned or held in a detent 49a, which allows for the slide member 24 to remain in the open position. After a load greater than about 3.0 kN (or, alternatively, 3.5 kN) is exerted on the seat belt 12, the restoring force of the spring 48 is overcome and the spring 48 moves out of the first detent 49a and into a second detent 49b. Thus, the slide member 24 moves into a gripping position.

In another embodiment, the slide member 24, insert 22, and tongue plate could also contain features to hold the slide in a belt gripping position after a belt load is reduced to any load less than the load that initiated the belt gripping condition.

In yet another embodiment, the belt gripping portions of the slide member 24 and insert 22 could also be shaped to make the load required to pull the shoulder belt portion 16 of the seat belt 12 towards the lap portion 14 greater than the load required to pull the lap portion 14 towards the shoulder portion 16.

In another exemplary embodiment, a fracturable portion (i.e. a feature designed to fracture and separate upon a predetermined load) that can cause the slide member 24 to move into a gripping position and cinch the webbing of seat belt 12, can be incorporated in the configuration of the tongue assembly 18. A load greater than 3.0 kN (or, alternatively, 3.5 kN) would cause a fracture that could move the slide member 24 into a belt gripping position.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A tongue assembly, comprising:
   a tongue releasably connectable to a buckle;
   a belt gripping insert;
   a slide member movable between a belt gripping position and a non-gripping position; and
   a slot in the tongue to receive a seat belt;
   a mating feature configured to prevent motion of the slide member; and
   a retention mechanism,
   wherein the retention mechanism holds the slide member initially in the non-gripping position to allow free sliding of the seat belt through the slot in the tongue,
   wherein the retention mechanism includes a retention feature on the slide member that contacts the mating feature, wherein the slide member moves to the belt gripping position when released by the retention mechanism when a predetermined load is exerted on the seat belt, the belt gripping position being configured to prevent movement of the seat belt within the slot, and wherein when the predetermined load is exerted on the seat belt, the retention feature separates from the mating feature to allow the slide member to move into the belt gripping position.

2. The tongue assembly of claim 1, wherein the slide member moves into the belt gripping position when a load of about 3.5 kN or more is exerted on the seat belt.

3. The tongue assembly of claim 2, wherein the slide member and belt gripping insert are integrally molded as a unitary piece.

4. The tongue assembly of claim 1, wherein the slide member moves to the gripping position by deformation of mating features.

5. The tongue assembly of claim 1, wherein the slide member includes a set of teeth to position the slide member in the open position and allow movement of the slide member into the gripping position.

6. The tongue assembly of claim 1, wherein the tongue includes a spring and first and second detents, wherein the spring moves from the first detent to the second detent to move the slide member from the open position to the gripping position.

7. The tongue assembly of claim 1, wherein the slide member moves into the belt gripping position when a load of about 3.0 kN or more is exerted on the seat belt.

8. The tongue assembly of claim 1, wherein the slide member remains in the non-gripping position until at least a load of about 3.0 kN or more is exerted on the seat belt to move the slide member into the gripping position to prevent translation of the seat belt from a lap portion to a shoulder portion.

* * * * *